April 12, 1966    R. T. BEALL ET AL    3,246,144
INHIBITION OF MICRO-ORGANISM GROWTH IN PETROLEUM FUEL
Filed Aug. 1, 1962    3 Sheets-Sheet 1
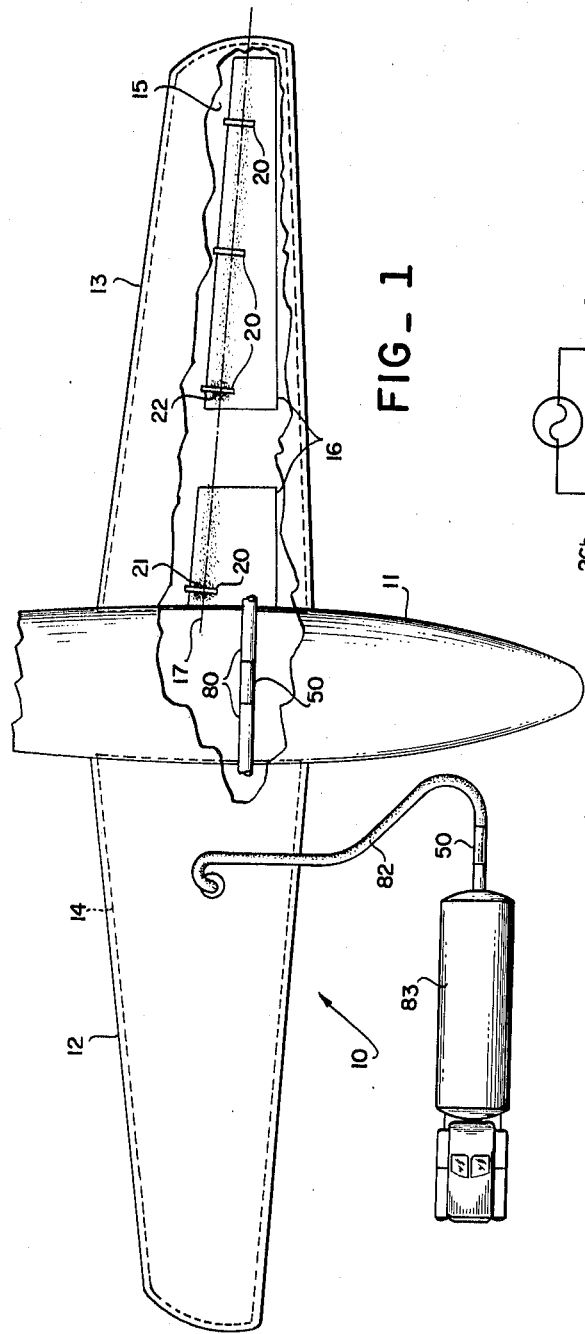
FIG._1
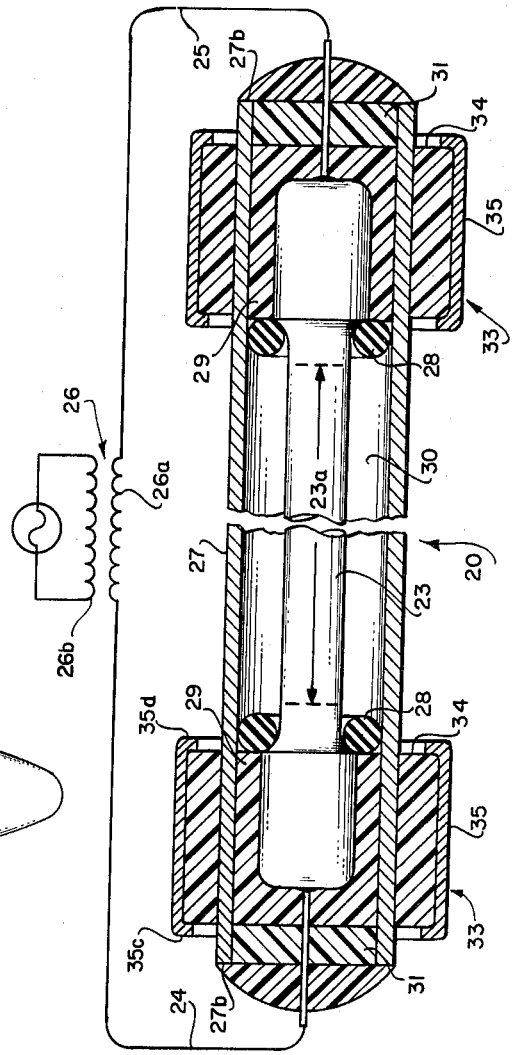
FIG._2
INVENTORS
ROBERT T. BEALL
NIELS H. NIELSEN
By George Sullivan
Agent April 12, 1966    R. T. BEALL ET AL    3,246,144
INHIBITION OF MICRO-ORGANISM GROWTH IN PETROLEUM FUEL
Filed Aug. 1, 1962    3 Sheets-Sheet 2
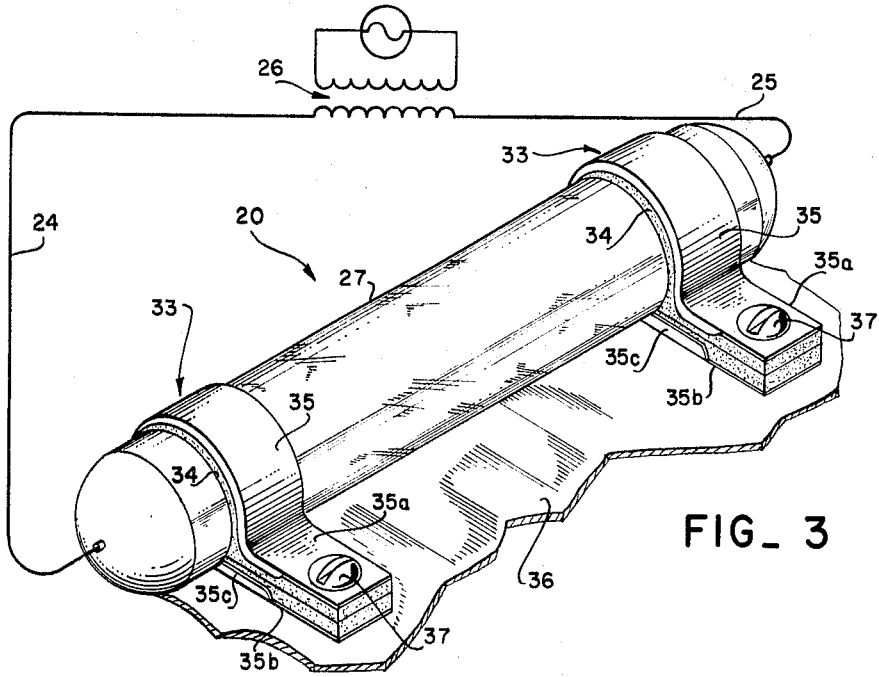
FIG_ 3
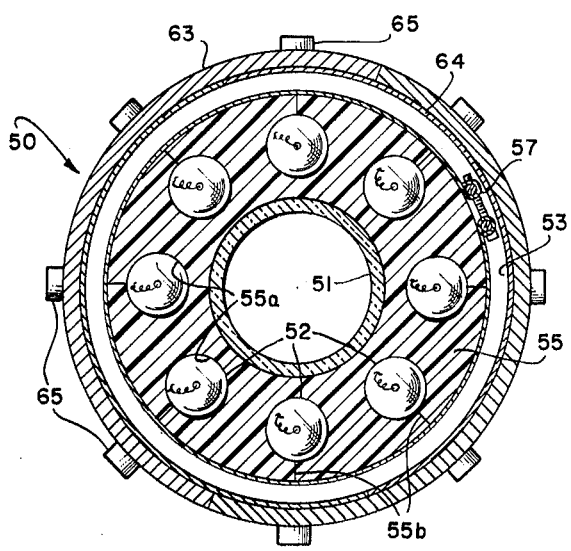
FIG_ 5
INVENTORS
ROBERT T. BEALL
NIELS H. NIELSEN
By *George Sullivan*
Agent

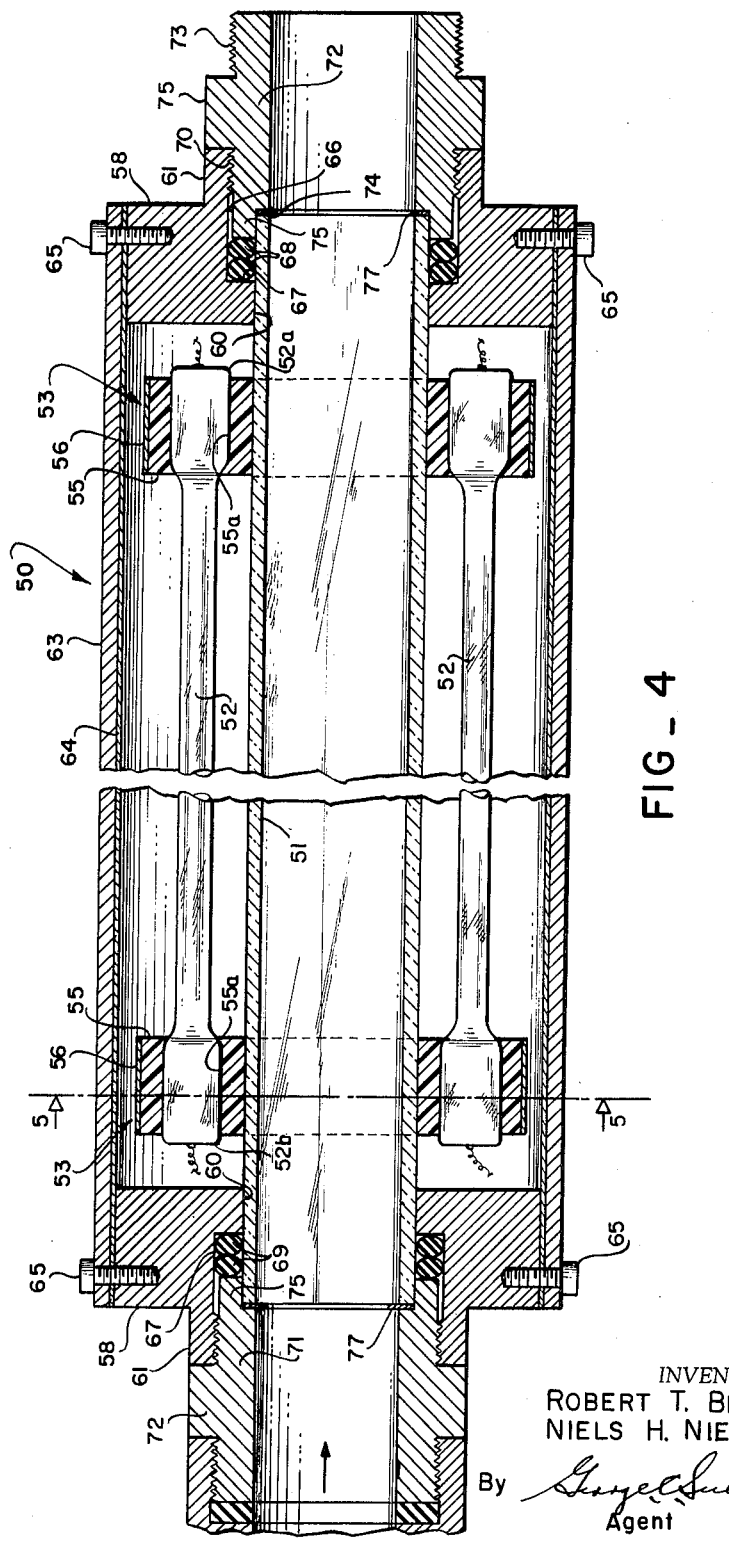
FIG_4

United States Patent Office 3,246,144
Patented Apr. 12, 1966

3,246,144
INHIBITION OF MICRO-ORGANISM GROWTH IN PETROLEUM FUEL
Robert T. Beall, Dunwoody, and Niels H. Nielsen, Austell, Ga., assignors to Lockheed Aircraft Corporation, Burbank, Calif.
Filed Aug. 1, 1962, Ser. No. 214,124
12 Claims. (Cl. 250—43)

This invention relates to a method and apparatus for the control of micro-organism growth in liquid and more particularly to a method and apparatus for the control of micro-organism growth in petroleum products.

It has been known for a number of years that there are micro-organisms such as bacteria and fungi which survive in and thrive on fuel and on fuel and water combinations, and more particularly the move viscous kerosene type fuels such as JP-4 and diesel fuel. For ease of description, fuel, and fuel and water combinations, which fall within the above-mentioned category will hereinafter be referred to generically as fuel. One of the principal ways in which fuel is contaminated is by coming in contact with bacteria and fungi contaminated water or air. Such contamination may be brought about in many ways. For example, to prevent fuel seepage through the bottom of large storage fuel tanks, the tanks are partially filled with water so that the fuel is contained by a water bottom. Also, water is frequently used as a divider between different types of petroleum products transported through pipe lines, and the fuel tanks of ships are filled with sea water after being unloaded to provide ballast and to guard against the explosive hazard created by vapor filled tanks. The problem presented by the growth of micro-organisms in aircraft fuel tanks has become quite serious. For example, it has been found that micro-organisms will build up a layer of green slime in the order of ¼-inch to ¾-inch thickness in an aircraft fuel tank, thus adding hundreds of pounds of dead weight to the aircraft. Also, the cicroorganisms are highly corrosive and have been known to corrode and penetrate the wing tanks of aircraft. This problem of micro-organism growth in fuel tanks is particularly severe when it occurs in integral wing tanks of aircraft, and it is toward the solution of this problem that this invention is specifically directed.

By way of background information, in recent years research has disclosed that ultraviolet light in the region of 2537 angstrom units is lethal to micro-organisms and that water is not sufficiently absorbent of ultraviolet light to preclude its penetration of water to kill micro-organisms. Insofar as applicants are aware, however, the decontamination of petroleum products has not been accomplished. The failure to extend the use of ultraviolet light to use with petroleum products is believed to stem from the facts that water and petroleum products, although both liquids, are so dissimilar as to be classified in completely different categories; because it was not known that petroleum products or fuels were sufficiently non-absorbent of ultraviolet light to make possible the penetration of the fuel by the ultraviolet light so as to kill the bacteria therein; and because prior to this invention it was unthinkable to even consider the possibility that an electrical lamp could be brought into contact with a fuel such as JP-4 without creating an explosion hazard.

Notwithstanding these substantial stumbling blocks, tests have been conducted proving that fuels are sufficiently non-absorbent of ultraviolet light to permit the use of ultraviolet light in decontamination of the fuel, as well as proving that lamp units emitting ultraviolet light could be constructed capable of killing micro-organisms in fuels without concern relative to explosion or fire. Accordingly, there is provided in accordance with this invention a method and apparatus for decontaminating fuel in aircraft fuel tanks and when being transferred from point to point in a transmission line.

It will be seen therefore that it is an object of this invention to provide a method of decontaminating fuels by the use of ultraviolet light.

It is another object of this invention to provide a method of arresting micro-organism growth in aircraft fuel tanks by locating the areas of micro-organism growth therein and selectively positioning explosion-proof ultraviolet lamps in the aircraft tank for maximum effective irradiation of the areas of growth.

It is still another object of this invention to provide a method of arresting micro-organism growth in aircraft or like fuel tanks by passing fuel therein relative to an ultraviolet light source during fueling of the tank and/or when the craft is under way.

A further object of this invention is to provide an ultraviolet lamp adapted for submersion in fuel which is explosion proof and substantially impact resistant.

A still further object of this invention is to provide a rugged lamp unit for the irradiation of liquid with ultraviolet light wherein the liquid is separated from the ultraviolet lamp by a protective tube.

Another object of this invention is to provide a unit for the irradiation of fluid in a transmission line comprising a quartz tube for conveying fluid and ultraviolet lamps disposed around the periphery of the tube for the irradiation of fluid flowing through the tube.

Other objects and advantages will become apparent from the following description taken in connection with the accompanying drawings in which:

FIGURE 1 is a schematic drawing of an aircraft and apparatus for preventing the growth of micro-organisms in the wing tanks of the aircraft;

FIGURE 2 is a sectional view of an ultraviolet lamp unit particularly adapted for submersion in fuel;

FIGURE 3 is a perspective view of the lamp unit of FIGURE 1;

FIGURE 4 is a sectional view of an ultraviolet lamp unit particularly adapted for mounting in a fuel line; and FIGURE 5 is a sectional view taken along the reference line 5—5 of FIGURE 4.

Generally stated, the depicted embodiments of the invention relate to an ultraviolet light arrangement for irradiating fuels to control or eliminate micro-organism growth therein; the ultraviolet lamps being arranged radially around a fuel passage or located proximate to or submerged in a body of fuel. Contact between the ultraviolet lamps and the fuel is prevented by high impact strength quartz therebetween.

More specifically, there is shown schematically in FIGURE 1 an aircraft 10 having fuselage 11 and wings 12 and 13 containing integral fuel tanks 14 and 15, respectively. Wing 13 is shown in partially cutaway section and typical areas of corrosion on the bottom of the tank are shown dotted within the areas circumscribed by the lines 16. These major areas of corrosion caused by micro-organism growth in the fuel tank 15 fall along the longitudinal reference line 17 which is the lowest extremity of the fuel tank. It will be appreciated that the areas in which micro-organism growth will be most detrimental to an aircraft fuel tank will occur at the lowest point in the fuel tank and, accordingly, it is preferable that ultraviolet lamps be positioned in these areas. Accordingly, ultraviolet lamp units 20 are positioned within the tank 15 at the areas 21 and 22 of maximum micro-organism growth and at spaced intervals along the length of the wing tank at the lowermost extremity of the tank. In a like manner, lamps 20 are selectively positioned within the tank 14.

Each ultraviolet lamp unit 20, shown in detail in FIGURES 2 and 3, comprises a cold cathode mercury vapor ultraviolet lamp 23 having electrical leads 24 and 25 connected to each end thereof. Leads 24 and 25 in turn are connected to the secondary 26a of high impedance current limiting reactor 26, the primary 26b of which is connected to electrical leads similar to those supplying power to the fuel pump in the aircraft tank in which the lamp unit is mounted. Lamp 23 is mounted in a quartz protective tube 27 and suitable sealing rings such as O-rings 28 are placed around the lamp in substantially sealing relation between the lamp 23 and the quartz tubes 27 a short distance on each side of the ultraviolet light emitting portion 23a of the lamp 23. Then a flowable fuel resistant rigid epoxy potting compound or encapsulant is poured into the ends 27a and 27b of the tube 27 such that the cement surrounds and covers the ends of the lamp 23 to form, when dry, structurally strong shock resistant end caps 29. O-rings 28 prevent the migration of encapsulant into the thermal insulating air space 30 at light emitting region 23a of the lamp 23 during its installation. End caps 29 support the lamp 23 within the tube 27, provide secondary anchoring of the leads 24 and 25 with respect to the lamp 23, and close the air space 30. After the end caps 29 have dried, a fuel resistant elastomer sealant 31, preferably a polysulfide sealant which is impervious to water and fuel over long periods of time, is then emplaced in each end of the tube 27.

To support the lamp unit 20 there are provided spaced apart support elements 33, best seen in FIGURE 3, each comprising a resilient fuel resistant elastomer vibration dampener 34 surrounded by a clamp band 35, the ends 35a and 35b of which are secured together and to any appropriate support structure 36 by screw 37. Band 35 may be provided with flanges 35c and 35d to prevent lateral displacement of dampener 34 and is constructed of a size such that when the screw 37 is tightly secured in place the elastomer 34 will be slightly in compression in gripping contact with the tube 27 to hold the tube 27 firmly in place. In addition to holding the tube 27 firmly in place, the elastomer performs the important function of absorbing vibrational forces which otherwise might be transmitted from the support structure 36 to the tube 27.

In operation, lamp units 20 are installed in the aircraft wing tanks 14 and 15 at the lowest portion of the tank along the longitudinal reference axis 17 and electrical leads 24 and 25 are connected to the secondary of the high impedance current limiting reactor 26. When turned on, the ultraviolet light emitted from the lamp 23 passes through the tube 27 with no losses and penetrates the fuel in the tank to kill the micro-organisms therein. The intensity and consequently the killing power of the ultraviolet light decreases as a function of the distance from the lamp 23 and the attenuating effect of the fuel; however, micro-organisms exposed to ultraviolet light at low intensity over long periods of time will be as readily killed as micro-organisms exposed to ultraviolet light at high intensity over short periods of time. Thus, it will be seen that properly placed ultraviolet lamp units 20 will readily kill micro-organisms and that the effectiveness of the lamp units 20 will be increased by agitation or sloshing of fuel in flight whereby a greater amount of fuel is brought into close proximity to the lamp units 20. It should further be noted that ultraviolet light of an intensity insufficient to actually kill micro-organisms in the tank 14 will prevent the reproduction of the micro-organisms therein. Thus, it will be seen that the provision of properly spaced ultraviolet lamp units 20 within the tank 14 effectively controls the formation of sludge in the tank by preventing the micro-organisms from reproducing even if all the micro-organisms are not killed.

An important aspect of this invention is that of submersion of the lamp units 20 in fuel. Lamp 23 is a cold cathode mercury vapor ultraviolet lamp which is available commercially and was selected for use because of its higher ultraviolet light output than a hot cathode lamp. Lamps of this type emanate 1-watt per inch of length and the heat produced by an unshielded lamp operating in ambient air at a temperature of 80° F., for example, will only elevate the temperature of the air in the proximity of the lamp to approximately 100° F., which temperature when compared with the automatic ignition point of JP–4 fuel of about 450° F. may be considered quite safe. The provision of the tube 27 in surrounding relation to lamp 23 and the insulating air space 30 therebetween reduces the external heating of the lamp unit 20 to a negligible value, thus eliminating the possibility of fuel explosion caused by heating of the fuel by a lamp unit 20. Further, the tube 27 has a low coefficient of thermal expansion and the rapid cooling or heating of the tube will not cause it to crack.

In conventional ultraviolet lamps wherein the terminals are spring biased into electrical contact with lamp sockets, there is always the possibility that vibrational forces will separate a lamp from the terminal socket a small amount, and an electrical arc will bridge the gap. Since if such occurred in or near fuel, an explosion might occur, elimination of this hazard is accomplished by leads 24 and 25 being directly connected by welding to the electrodes of the lamp 23 to prevent their separation by vibrational forces. To further insure against explosion, the place of connection of the lamp electrodes and leads 24 and 25 has been segregated from the fuel by the end caps 29 and the impervious elastomer. The protective tube 27 is selected to be of a thickness greater than the lamp 23 so as to protect the lamp 23 from impact. As ultraviolet light may be transmitted through quartz substantially without loss and because quartz tubing is at least five times as strong as glass tubing of the same thickness, the quartz tube 27 provides a very effective protective shield for the lamp 23.

Referring to FIGURES 4 and 5, another embodiment of this invention utilizes a lamp unit 50 particularly adapted to irradiate a fluid flow through a transmission line. For example, it is contemplated to connect a lamp unit 50 into the transfer line 80, FIGURE 1, through which fuel is transferred between aircraft fuel tanks 14 and 15. Although the lamp units 20 when used alone effectively kill micro-organisms in the wing tanks 14 and 15, it is possible that some micro-organisms may stay out of effective range of the ultraviolet light emitted by the lamps 23. To eliminate the detrimental results of this possibility, it is contemplated to use the lamp unit 50 in transfer line 80 in combination with the lamp units 20 in the wing tanks 14 and 15 for irradiating the fuel during transfer between the wing tanks 14 and 15, as occurs at regular intervals during flight to maintain proper distribution of weight in the aircraft. An alternate and auxiliary implementation of the lamp unit 50 is also disclosed in FIGURE 1 wherein a lamp unit 50 is disclosed as being contained in the transmission line 82 of fuel tank 83 for irradiating the fuel and killing micro-organisms therein as when the wing tanks 14 and 15 are being filled. As the killing power of ultraviolet light is dependent upon the intensity and time of irradiation of the micro-oragnisms, the flow rate of the fuel from the truck 83 may be correlated and adjusted with respect to the intensity of ultraviolet light provided by the lamp unit 50 so that killing of the micro-organisms is assured. Although the lamp unit 50 is specifically designed as an auxiliary item of equipment for use in combination with the ultraviolet lamp units 20 mounted in the aircraft fuel tanks 14 and 15, it is to be understood that the lamp unit 50 could be used alone at airports independently of any lamp units 20 in the aircraft fuel tanks.

The lamp unit 50, shown in detail in FIGURES 4 and 5, comprises a relatively thick cylindrical quartz tube 51 having a plurality of ultraviolet lamps 52 mounted in predetermined spaced apart relation about the periphery of the tube 51. It will be appreciated that the number of lamps 52 required to be provided depends upon the intensity of the ultraviolet light produced by the lamps and the rate of fluid flow through the lamp unit 50. Terminal ends 52a and 52b of lamps 52 are mounted in support elements 53 each comprising a resilient elastomer portion 55 and a clamp band 56. When the clamp bands 56 of the support elements 53 are tightened down by the use of clamp assemblies 57, the elastomeric portions 55 are slightly compressed and forced into gripping engagement with the lamp ends 52a and 52b, and the tube 51 to hold the lamps 52 fixedly in place. Alternately, the end caps 58, later to be described in detail, could be provided with confronting supports upon which the lamps 52 could be mounted by support elements 53. Each elastomeric portion 55 is preferably made of a single piece of material which is provided with holes 55a of slightly larger diameter than the terminal ends of the lamps 52, which holes are intersected by radial slits 55b, FIGURE 5. Thus, it will be seen that the lamps 52 may be installed simply by inserting the terminal ends thereof through the slits 55b into the holes 55a of the elastomer 55 and then fastening the clamp bands 56 in place. By a reverse operation, the lamps are readily individually removable for replacement.

To make the lamp unit fluid tight and more particularly to prevent fuel flow in tube 51 from communicating with the lamps 52, there are provided substantially cylindrical ends caps 58 each having a central through hole 60 of substantially the same diameter as the external diameter of the tube 51 and a neck 61. The end caps 58 are mounted adjacent the terminal ends of tube 51 and are secured in spaced apart relation by a two-piece hollow cylindrical steel protective cover 63 which is lined with a two-piece reflector 64, preferably a polished, highly reflective aluminum lighting plate. The protective cover 63 and reflector 64 are secured to the exterior cylindrical surfaces of ends caps 58 by bolts 65. The through holes 60 of end caps 58 are counterbored at 66 to provide the space 67 between the end caps and the tube 51 such that the O-rings 68 may be emplaced therein. O-rings 68 are of such a size that they are slightly in compression between tube 51 and end caps 58 to prevent the free unrestricted movement of the tube relative to the end caps. The interior of neck 61 is provided with screw threads 70, and the threaded end 71 of coupling collar 72 is threadably engaged with the screw threads 70 while the threaded end 73 of collar 72 is adapted to be connected to a fluid transmission line. End 71 of coupling collar 72 is counterbored to form the seat 74 and the resulting reduced annular end portion 71 fits into the space 67 and compresses the O-rings 68 into fluid tight sealing engagement with the end cap 58 and tube 51. The lengths of neck 61 and threaded end 71 are such that when the O-rings are compressed into their sealing position, the head 75 of collar 72 is firmly seated on the terminal end of neck 61 and the seat 74 is in snug engagement with the terminal end of tube 51 with a resilient washer 77 preferably interposed therebetween. The upstream washer 77 preferably protrudes into the flow passage formed by the tube to assure that fluid flows through the tube 51 in a turbulent state. Turbulent flow of fluid through the tube 51 performs the function of cleaning the tube and bringing as much fluid as possible in close proximity to the lamps 52.

In operation, the lamp unit 50 is connected into a fluid transmission line by threadably engaging the coupling collars 72 with the cooperating coupling collars of a fluid transmission line and the ultraviolet lamps 52 are connected to a source of energizing power. The flow rate of the fluid through the lamp unit 50 may be then adjusted, if desired, with respect to the intensity of ultraviolet light emanated by the lamps 52 so that a killing of micro-organisms in the fluid will be assured.

It will be seen that the method and apparatus as described in detail above provide an efficient, practical means of controlling or eliminating growth of micro-organisms in fuels by the irradiation of fuel with ultraviolet light.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A method of eliminating the contamination of integral aircraft wing fuel tanks from micro-organisms comprising the steps of mounting ultraviolet lamp units at the lowermost extremity of the fuel tank, spacing said lamp units at predetermined intervals along the length of said tanks, protecting the lamps and the electrical connections thereto which comprise the lamp units from combustion-inducing exposure to the combustible contents of the fuel tank, and energizing said ultraviolet lamps for the irradiation of micro-organisms in said tank.

2. A method of eliminating the contamination of aircraft fuel tanks connected together by a transfer line by the growth of micro-organisms in the fuel therein comprising the steps of mounting an ultraviolet lamp unit in the transfer line, protecting the lamp and the electrical connections thereto which comprise the lamp unit from combustion-inducing exposure to the combustible contents of the transfer line, and energizing the lamp unit for irradiation of fuel during transfer between the fuel tanks.

3. A method of eliminating the contamination of aircraft fuel tanks connected together by a transfer line by the growth of micro-organisms in the fuel therein comprising the steps of positioning ultraviolet lamp units in the fuel tanks for the irradiation of fuel therein, positioning an ultraviolet lamp unit in the transfer line for the irradiation of fuel during transfer between the fuel tanks, and protecting the lamps and the electrical connections thereto which comprise the lamp units from combustion-inducing exposure to the combustible contents of the fuel tanks and the transfer line.

4. A method of eliminating the contamination of fuel by the growth of micro-organisms therein comprising the steps of positioning an ultraviolet lamp unit in a fuel transmission line, protecting the lamp and the electrical connections thereto which comprise the lamp unit from combustion-inducing exposure to the combustible contents of the transmission line, and energizing the lamp unit for irradiation of fuel in said line.

5. A method of eliminating the contamination of fuel by the growth of micro-organisms therein comprising the steps of mounting an ultraviolet lamp unit in a fuel line for flow of fuel therethrough, protecting the lamp and the electrical connections thereto which comprise the lamp unit from combustion-inducing exposure to the combustible contents of the fuel line, energizing the lamp unit for irradiation of fuel flowing through the lamp unit, and adjusting the rate of fuel flow through the lamp unit with respect to the intensity of ultraviolet light emanated by the lamp unit into the fuel for killing of any micro-organisms in the fuel.

6. A method of eliminating the contamination of aircraft fuel tanks comprising the steps of positioning an ultraviolet lamp unit in the fuel transmission line from which the tanks are filled for irradiation of fuel therein during fueling of the tanks, positioning ultraviolet lamp units in the fuel tanks for irradiation of fuel therein during operation of the aircraft, and protecting the lamps and the electrical connections thereto which comprise the lamp units from combustion-inducing exposure to the combustible contents of the transmission line and the fuel tanks.

7. A submersible ultraviolet lamp unit comprising:
a quartz protective tube; an ultraviolet lamp mounted in said tube with the ends of said lamp mounted inwardly from the ends of said tube; electrical leads connected to said lamp and extending outwardly from said tube; and sealing means sealing the ends of said lamp with respect to said tube.

8. The lamp unit of claim 7 wherein said sealing means is chemically inert to fuel.

9. A submersible ultraviolet lamp unit comprising: a quartz protective tube, an ultraviolet lamp mounted in said tube with the ends of said lamp disposed inwardly of the ends of said tube, end caps mounting said ends of said lamp in spaced apart relation from said tube; and resilient vibration damping support means for said lamp supportingly connected to said tube externally thereof in concentric relation to said end caps.

10. A submersible ultraviolet lamp unit comprising: a quartz protective tube; an ultraviolet lamp mounted in said tube with the ends of said lamp disposed inwardly from the ends of said tube; electrical leads connected to the ends of said lamp and extending outwardly from said tube; end caps mounting the ends of said lamp in spaced apart relation from said tube and covering the terminal ends of said lamp; impervious chemically inert sealing means filling the space between the end of said end caps and the end of said tube; support means for mounting said lamp unit including a resilient portion contiguous said tube, and a clamp band surrounding said resilient portion in gripping engagement with said tube; and means for securing said support means to supporting structure.

11. An ultraviolet lamp unit comprising: a quartz protective tube; coupling means for connecting said tube into a fluid line; ultraviolet lamps mounted in spaced apart relation about and in axial alignment with said tube; spaced-apart support members substantially fixedly mounting said lamps with said tube, each of said support members including a resilient elastomeric portion surrounding an end of said lamps and contiguous said tube; clamp bands surrounding each of said resilient elastomeric portions to hold said resilient elastomeric portions in gripping engagement with said tube; and a reflector surrounding said lamps for reflecting ultraviolet light emanated from said lamps toward the axial centerline of said tube.

12. An ultraviolet lamp unit comprising: spaced apart end supports each having a central hole therethrough; a quartz tube mounted with its opposite ends received in said central through holes; a reflector connected at each end to said end supports; ultraviolet lamps mounted between said tube and said reflector; said end supports each being counterbored at their opposed ends to form an annular space between each said end support and the ends of said tube; at least one resilient sealing ring mounted in each said annular space in engagement with each said end supports and said tube ends; and coupling means connected to each said end support, each having an annular portion extending into an annular space to compress the resilient ring therein into fluid tight sealing engagement with said tube end and end support.

References Cited by the Examiner

UNITED STATES PATENTS

| | | | |
|---|---|---|---|
| 1,307,500 | 6/1919 | Keyes | 250—49 X |
| 1,896,379 | 2/1933 | Ross | 250—48 |
| 2,018,332 | 10/1935 | Trebler et al. | 250—49 X |
| 2,072,418 | 3/1937 | Berndt et al. | 250—48 |
| 2,282,024 | 5/1942 | Bitner | 250—48 |
| 2,340,890 | 2/1944 | Lang et al. | 250—48 |
| 2,648,774 | 8/1953 | Whitlock | 250—43 |
| 2,669,661 | 2/1954 | Riddiford et al. | 250—43 |
| 2,670,439 | 2/1954 | Darney | 250—43 |
| 2,857,520 | 10/1958 | Wilgen | 250—48 X |
| 2,935,611 | 5/1960 | Myers | 250—48 X |
| 2,968,719 | 1/1961 | Haberle et al. | 250—43 |

FOREIGN PATENTS 324,503   1/1930   Great Britain.

RALPH G. NILSON, *Primary Examiner.*

ARCHIE R. BORCHELT, *Examiner.*